United States Patent [19]

Fujita

[11] 3,873,684

[45] Mar. 25, 1975

[54] SENSITIZED CELL FOR USE IN THE PASSIVE AGGLUTINATION AND METHOD OF PREPARING THE SAME

[75] Inventor: Koichiro Fujita, Wako, Japan

[73] Assignee: Fujizoki Seiyaku Kabushiki Kaisha, Tokyo, Japan

[22] Filed: Dec. 19, 1973

[21] Appl. No.: 426,005

Related U.S. Application Data

[63] Continuation of Ser. No. 210,574, Dec. 21, 1971, abandoned.

[30] Foreign Application Priority Data

Dec. 26, 1970  Japan.............................. 45-130693

[52] U.S. Cl........................... 424/12, 424/3, 424/8, 424/11, 424/13
[51] Int. Cl.... C12k 1/00, G01n 31/06, G01n 33/16
[58] Field of Search.................. 424/3, 8, 11, 12, 13

[56] References Cited
UNITED STATES PATENTS
3,553,310   1/1971   Csizmas........................... 424/12 X

OTHER PUBLICATIONS

Kabet, Exptl. Immunochem., C. C. Thomas, Springfield, Ill, 2nd Ed., 1961, pp. 97–98, 109, 110.

Kwapinski, Methods of Serol. Res., J. Wiley & Sons, N.Y. 1965, pp 145–146.

Lamanna, Basic Bacti, Williams & Wilkins,, Balto., 3rd Ed., 1965, pp. 266–273, 290.

*Primary Examiner*—Albert T. Meyers
*Assistant Examiner*—Anna P. Fagelson

[57] ABSTRACT

This invention discloses sensitized cells for use in passive agglutination. Such cells are prepared by using as a carrier micro-organisms which have been subjected to the cell wall fixation thereof with formaldehyde and then the intracellular fixation thereof at a temperature above 90°C for at least 5 minutes and adsorbing an antigen or an antibody on the carrier.

7 Claims, No Drawings

SENSITIZED CELL FOR USE IN THE PASSIVE AGGLUTINATION AND METHOD OF PREPARING THE SAME

This is a continuation, of application Ser. No. 210,574, filed Dec. 21, 1971 now abandoned.

BACKGROUND OF THE INVENTION

Matter obtained by adsorbing an antigen or an antibody on a particulate material of the desired size (said particulate being a carrier) undergoes agglutination with the corresponding antibody or antigen. Such agglutination is referred to as passive agglutination and the above-mentioned matter adsorbed an antigen or an antibody is referred to as "sensitized cell" in this specification. The sensitized cell may be designated as an "indicator" which can detect an antigen or an antibody by usual means.

As a conventional carrier for a sensitized cell, non-biological materials such as polystyrene latex, kaolin or charcoal powder or a biological material such as an erythrocyte (red blood cell) of an animal have been used.

Methods of preparing the sensitized cell in which polystyrene latex, kaolin, charcoal powder or an erythrocyte is used, are disclosed in the following references:
1. Polystyrene latex; U.S. Pat. No. 3,077,875
2. Kaolin; M. Abe: "Basic research on agglutination using kaolin as a carrier for syphilis antibody", The Tokyo Journal of Medical Science, 61, 249–272, 1953.
3. Charcoal; J. Portnoy, J. H. Brewer and A. D. Harris: "Rapid plasma reagent card test for syphilis and other treponematoses", Public Health Reports, 77(8), 645–651, 1962.
4. Erythrocyte; S. V. Boyden: "The adsorption of proteins on erythrocytes treated with tannic acid and subsequent hemagglutination by antiprotein sera", Journal of Experimental Medicine, 93, 107–120, 1951.

A non-biological carrier has advantages in that it is chemically stable and has no antigenic activity but is objectionable in that it does not firmly adsorb an antigen or an antibody. Therefore, in the sensitized cell prepared by using a non-biological carrier, the adsorbed antigen or antibody is easily detached from the carrier when the sensitized cell is subjected to a drying or freezing procedure. Accordingly, such a sensitized cell must be stored in a liquid state in a dark and cold place and furthermore cannot be stored for a long period.

When kaolin or charcoal is used as a carrier, the sensitized cells having a uniform particle size cannot be obtained because kaolin or charcoal of a uniform size is difficult to obtain. On the other hand, while polystyrene latex particles of uniform size may be obtained, such polystyrene latex particles agglutinate spontaneously in a medium of a pH 5.0 to 8.0 without the antigen-antibody reaction. Therefore, when polystyrene latex particles are used as the carrier, a test of the antigen-antibody reaction must be carried out in a suitable buffer solution such as an alkaline solution of a pH higher than 8.6. However, human serum has the pH of about 7.2. Polystyrene latex particles are objectionable because they agglutinate undesirably when used as a carrier of the sensitized cell which is used in a neutral medium of pH 7.2.

The erythrocyte of a mammal such as sheep, which is a biological carrier, has a uniform particle size and is easily obtainable, but its size is generally large, i.e., about 6 to 8 microns. Therefore, when such biological carriers are used, a test of the agglutination reaction may only be carried out in a large vessel such as a test tube. When the test is carried out on a slide, the preferred clumps of agglutination — by which a positive or negative reaction in the passive agglutination may be detected — cannot be obtained because of the large size of the carrier. This is well known to those skilled in the art.

In order to provide improved sensitized cells which do not have the aforesaid disadvantages, we have discovered the use of micro-organisms as a carrier of the sensitized cells.

As a result of our study, we have found the following facts:

1. There are various kinds of micro-organisms which are different in size and shape. Accordingly, we can choose a micro-organism having a desired size and shape in the range of from $0.2\,\mu$ to $5\,\mu$. However, living micro-organisms undergo autolysis by their own enzymes to decompose themselves and therefore the sensitized cells prepared from living micro-organisms cannot be stored for a long period. Moreover, living micro-organisms are hydrophilic as they have a strong affinity to water so that an antigen or an antibody adsorbed on a micro-organism cannot react with the corresponding antibody or antigen in a medium to produce a clump of the passive agglutination in the antigen-antibody reaction.

2. By subjecting a micro-organism to the cell wall fixation with formaldehyde, the storage life of the sensitized cells may be improved, but these sensitized cells cannot yet show the desired passive agglutination in the antigen-antibody reaction.

3. The improved sensitized cells without the aforesaid disadvantages can be obtained by using as a carrier of the sensitized cells, micro-organisms which have been subjected to cell wall fixation with formaldehyde (hereinafter referred to as "formaldehyde-fixation") and then conducting the intracellular fixation thereof at a temperature above 90°C for at least 5 minutes (hereinafter referred to as "heat-fixation"). The present invention is based on this discovery.

SUMMARY OF THE INVENTION:

The present invention relates to sensitized cells for use in passive agglutination and a method of preparing such sensitized cells.

The sensitized cells of the present invention are prepared by using a micro-organism as a carrier of the sensitized cell and adsorbing an antigen or antibody on a carrier. The carriers are the micro-organisms which have been subjected to cell wall fixation with formaldehyde by intracellular fixation at an elevated temperature.

Various micro-organisms which can satisfy the following requirements, may be used as carriers of the sensitized cell; Such micro-organisms are those which:
1. have no serological activity,
2. do not cause non-specific agglutination,
3. can strongly adsorb an antigen or an antibody and do not change the antigenicity,
4. have a certain size,
5. have specific gravity similar to that of the medium, 6. are stable even after prolonged storage.

Suitable micro-organisms which satisfy the above-mentioned conditions, are, for example, as follows:

*Saccharomyces cerevisiae*(size: 5 μ)

*Serratia marcescens*(size: 0.5 × 0.5~1.0 μ)

*Brucella abortus*(size: 0.25 μ)

In addition, the following micro-organisms may also suitably be used:

*Bacillus subtilis*, *Bacillus cereus*, *Bacillus megatherium*, *Proteus vulgaria*, *Bacterium zopfii*, *Lactobacillus bulgaricus*, *Acetobactor suboxydans*, *Streptococcus lactis*, *Streptococcus cremoris*, *Tetracoccus liquefaciens*, *Sarcina lutea*, *Micrococcus lysodelkties*, *Staphylococcus*, *Saccharomyces delbruckii lindner*, *Eremaseus fertilis*, *Endomyces bisporus*, *Cryptococcus albidus* and the like.

The following examples are given by way of illustration of the method of carrying out the present invention and are not intended as a limitation of this invention.

EXAMPLE 1

In this Example, "*Brucella abortus*" which has been cultivated in an agar culture medium containing serum of cattle was used as a carrier of the sensitized cell.

25 mg. of *Brucella abortus* cultivated as above, was suspended in 1 ml of a saline solution containing 0.3% formaldehyde and allowed to stand while stirring at a room temperature for 12 hours to produce the cell wall fixation. The Brucella abortus carrier thus treated was separated, washed with distilled water, and then suspended again in 1 ml of distilled water. This aqueous suspension was heated at a temperature of 120°C for 20 minutes in an autoclave. The carrier thus treated was dyed with "haematoxylin –$Fe^{++}$" while stirring for 12 hours, washed with water and suspended in 1 ml of 0.15M PBS (phosphate buffer saline) solution having a pH 7.2.

The above dyed carrier was treated with a 0.15M PBS solution containing 0.02% of tannic acid.

1 ml of the PBS solution containing 25 mg of the tannic acid-treated carrier was mixed with 1 ml of the 0.15M PBS solution containing 2 mg of a proteinic antigen, i.e. Streptolysin O, and the mixture was allowed to stand at a temperature of 37°C and a pH of 6.4 for 40 minutes effect adsorbtion of the antigen on the carrier.

The antigen adsorbed carried (i.e. "the sensitized cell with Streptolysin O") was washed with the 0.15M PBS solution (pH 7.2) and then the sensitized cell was suspended in a 0.15M PBS solution containing normal rabbit serum and glycine. Thus, a suspension of the desired sensitized cell (indicator) for use in the passive agglutination was obtained.

It is understood that the above tannic acid-treated carrier can adsorb other antigens, for example, Streptokinase, a *Treponema pallidum* cell component, Thyroglobulin and the like in the same manner described above and the sensitized cells thus obtained can suitably be used in the corresponding passive agglutination.

In the above example, the formaldehyde-fixed micro-organism was heated at a temperature of 120°C for 20 minutes. The micro-organism thus treated was compared with the non-treated micro-organism and the formaldehyde-fixed micro-organism in the following way.

100 mg of each of said micro-organism was respectively suspended in 1 ml of distilled water and 1 ml of a saturated aqueous solution of sodium citrate was added to the suspension to compare the coagulation. The results are as follows:

| micro-organism | degree of coagulation * |
|---|---|
| non-fixed (non-treated) | +++ |
| fixed with formaldehyde | ++ |
| fixed by the present invention | – |

* +++ completely coagulated
++ moderately coagulated
– not coagulated

Generally, a colloid has a particle size in the range of 0.001 μ to 0.1 μ. On the other hand, the micro-organisms used in this invention vary from 0.2 μ to 5 μ. Such micro-organisms cannot be considered as colloids. However, an aqueous suspension of said micro-organisms shows a behavior similar to that of colloidal solution.

In colloid chemistry, it is well known that by adding a saturated aqueous solution of sodium citrate, a hydrophilic colloidal solution is easy to coagulate and a hydrophobic colloidal solution is difficult to coagulate, i.e., a saturated aqueous solution of sodium citrate is used for detecting whether a colloid is hydrophilic or hydrophobic.

Therefore, from the above result, it has become clear that the micro-organism has changed from a hydrophilic colloidal state to a hydrophobic colloidal state by the heat-fixation method.

For the purpose of showing the superiority of the present invention, a series of tests comparing the passive agglutination of sensitized cells was carried out as follows:

1. Preparation of sensitized cell with Streptolysin O a. Sensitized cell A was prepared by the above-mentioned procedure except that the formaldehyde-fixation and the heat-fixation were not used.

b. Sensitized cell B was prepared by the above-mentioned procedure except that heat-fixation was not used.

c. Sensitized cell C-1 was prepared by the above-mentioned procedure and Sensitized cells C-2 ~C-6 were prepared by the above-mentioned procedure except that heat-fixation was effected by using the following temperature and the following time instead of using a temperature of 120°C and time of 20 minutes.

| | | |
|---|---|---|
| Sensitized cell C-2 | 90°C, | 12 hours |
| Sensitized cell C-3 | 100°C, | 5 hours |
| Sensitized cell C-4 | 110°C, | 1 hour |
| Sensitized cell C-5 | 130°C, | 10 minutes |
| Sensitized cell C-6 | 135°C, | 5 minutes |

2. Test method a. The passive agglutination was compared as follows:

Diluted serums were prepared as follows:

A serum obtained from blood infected with Streptococcus hemolyticus was diluted to the desired concentration with 0.15M PBS solution. The degrees of the dilution were 1 : 10, 1

: 20, 1 : 40, 1 : 80, 1 : 160, 1 : 320, 1 : 640 and 1 : 1280.

The passive agglutination was observed by adding one drop of each suspension of Sensitized cell A~C-6 to each of the diluted serums.

b. Specific viscosities of the suspension of Sensitized cells A~C-6 were measured at a temperature of 25°C by using Ostwald's viscometer. In this case, the suspension containing 10 mg of the sensitized cell in 1 ml thereof was used.

3. Results a. Results according to Test method (a)

| Degree of dilution of serum Sensitized cell | 1:10 | 1:20 | 1:40 | 1:80 | 1:160 | 1:320 | 1:640 | 1:1280 * |
|---|---|---|---|---|---|---|---|---|
| A | -- | -- | -- | -- | -- | -- | -- | -- |
| B | + | + | -- | -- | -- | -- | -- | -- |
| C-1 | ++ | ++ | ++ | ++ | ++ | + | -- | -- |
| C-2 | ++ | + | + | -- | -- | -- | -- | -- |
| C-3 | ++ | ++ | ++ | ++ | + | -- | -- | -- |
| C-4 | ++ | ++ | ++ | ++ | + | -- | -- | -- |
| C-5 | ++ | ++ | ++ | ++ | + | -- | -- | -- |
| C-6 | ++ | ++ | ++ | ++ | + | -- | -- | -- |

\* -- : non-agglutination
+ : moderate agglutination
++ : complete agglutination b. Results according to Test method (b)

| Sensitized cell | Specific viscosity |
|---|---|
| A | 1.0310 |
| B | 1.0287 |
| C-1 | 1.0195 |
| C-2 | 1.0245 |
| C-3 | 1.0234 |
| C-4 | 1.0215 |
| C-5 | 1.0223 |
| C-6 | 1.0205 |

4. Analysis

From the results of the test, it is clear that the Sensitized cells C-1~C-6 are desirably used in the passive agglutination. These sensitized cells are prepared by using the micro-organisms which have been subjected to the formaldehyde-fixation and the heat-fixation at a temperature about 90°C for at least 5 minutes.

The suspensions of Sensitized cells C-1~C-6 have low specific viscosity. Such low viscosity of the suspension is attributed to the change from the hydrophilic colloidal state to the hydrophobic colloidal state of the micro-organisms. Thus, the sensitized cells prepared from the hydrophobic colloidal micro-organisms are desirably used in the passive agglutination.

Furthermore, the sensitized cells obtained as above can be readily dyed by a dyestuff such as Fuchsine or Methylene Blue. Accordingly, we can more easily detect the passive agglutination by using the dyed sensitized cells or by adding the dyestuff to the medium for use in dilution of the serum to be examined.

In the above-mentioned formaldehyde-fixation, the concentration of a solution of formaldehyde, temperature of the solution and time of the fixation may vary optionally and depend on the kind of the micro-organism to be treated. Generally, the concentration of from 0.2% to 20%, the temperature of from 0°C. to 37°C and the time of from 30 minutes to 72 hours may be desirably used.

EXAMPLE 2

A sensitized cell was prepared by repeating the same procedure as that of Example 1 except that:

1. Saccharomyces cerevisiae which has been cultivated in an agar culture medium containing 1% of maltose was used as a carrier in place of Brucella abortus, 2. An antigen, "Treponema pallidum cell component" was used in place of Streptolysin O, and 3. A serum obtained from blood infected with syphilis was used in place of a serum obtained from blood infected with Streptococcus hemolyticus.

The sensitized cell thus prepared produced results similar to those exhibited by the sensitized cell of Example 1 in the antiger-antibody reaction.

In the above Examples 1 and 2, the sensitized cells in which an antigen has been adsorbed to the carrier were shown. However, the micro-organism subjected to the formaldehyde-fixation and the heat-fixation as above may also be used as a carrier to which an antibody is adsorbed and the sensitized cell having the adsorbed antibody may react with the corresponding antigen to cause the passive agglutination in the manner similar to that shown in Examples 1 and 2.

What is claimed is:

1. A method of preparing a sensitized cell for use in passive agglutination comprising subjecting a microorganism to cell wall fixation by treatment with formaldehyde at a concentration of from 0.2 to 20% at a temperature ranging between 0° and 37°C for a period of time varying up to about 12 hours followed by heating the formaldehyde treated organism at an elevated temperature varying between 90° and 135°C for a period of time ranging from 5 minutes to 5 hours, treating the cell with tannic acid and adsorbing on the surface of said tannic acid-treated microorganism, an antigen or antibody.

2. The sensitized cell prepared by the method of claim 1.

3. The method of claim 1 wherein the intracellular fixation of the microorganism is carried out in an aqueous solution.

4. The method of claim 1 wherein the microorganism varies in size between 0.2 and 5 microns.

5. The method of claim 1 wherein the microorganism is Brucella abortus or Saccharomyces cerevisiae.

6. The method of claim 1 wherein the microorganism is selected from the group consisting of Saccharomyces cerevisiae, Serratia marcescens, Brucella abortus, Bacillus subtilis, Bacillus cereus, Bacillus megatherium, Proteus vulgaris, Bacterium zopfii, Lactobacillus bulgaricus, Acetobactor suboxydans, Streptococcus lactis, Streptococcus cremoris, Tetracoccus liquefaciens, Sarcina lutea, Micrococcus lysodelkties, Straphylococcus, Saccharomyces delbruckii lindner, Eremascus fertilis, Endomyces bisporus and Cryptococcus albidus.

7. The sensitized cell prepared by the method of claim 6.

* * * * *